United States Patent
Brennan et al.

(10) Patent No.: US 11,819,162 B2
(45) Date of Patent: Nov. 21, 2023

(54) INSERT FOR COOKING APPARATUS

(71) Applicants: Desora, Inc., Cambridge, MA (US); Premier Specialty Brands, LLC, Duluth, GA (US)

(72) Inventors: Robert Brennan, Peachtree Corners, GA (US); Elizabeth O. Ogunbiyi, Cambridge, MA (US); Michel N. Maalouly, Cambridge, MA (US); Kevin K. Parker, Watertown, MA (US)

(73) Assignees: Desora, Inc., Cambridge, MA (US); Premier Specialty Brands, LLC, Duluth, GA (US)

( * ) Notice: Subject to any disclaimer, the term of this patent is extended or adjusted under 35 U.S.C. 154(b) by 0 days.

(21) Appl. No.: 16/959,938

(22) PCT Filed: Jan. 9, 2019

(86) PCT No.: PCT/US2019/012930
§ 371 (c)(1),
(2) Date: Jul. 2, 2020

(87) PCT Pub. No.: WO2019/140002
PCT Pub. Date: Jul. 18, 2019

(65) Prior Publication Data
US 2021/0068590 A1   Mar. 11, 2021

Related U.S. Application Data

(60) Provisional application No. 62/631,346, filed on Feb. 15, 2018, provisional application No. 62/616,333, filed on Jan. 11, 2018.

(51) Int. Cl.
*A47J 37/07* (2006.01)
*F26B 5/06* (2006.01)

(52) U.S. Cl.
CPC ....... *A47J 37/0786* (2013.01); *A47J 37/0763* (2013.01); *A47J 2037/0795* (2013.01)

(58) Field of Classification Search
CPC ............ A47J 2037/0795; A47J 37/0763; A47J 37/0786; F24B 5/06
See application file for complete search history.

(56) References Cited

U.S. PATENT DOCUMENTS

| 58,638 A | * | 10/1866 | Kent | ......................... F24B 5/06 126/1 AE |
| 1,343,832 A | * | 6/1920 | Kuypers | ................... E04H 5/12 454/45 |

(Continued)

FOREIGN PATENT DOCUMENTS

| DE | 322958 C | * | 7/1920 | ................ F24B 5/06 |
| EP | 3 033 977 A1 | | 6/2016 | |

(Continued)

OTHER PUBLICATIONS

International Search Report and Written Opinion dated May 7, 2019.

*Primary Examiner* — Jorge A Pereiro
*Assistant Examiner* — Logan P Jones
(74) *Attorney, Agent, or Firm* — Foley & Lardner LLP (57) ABSTRACT

An insert is provided for use in a cooking apparatus that alters the pressure profile, air velocity profile, and airflow pattern within said cooking apparatus in order to achieve a cyclonic air profile around food to be cooked. The insert includes a ring-shaped insert body formed by a continuous sidewall. The sidewall has an external surface and an internal surface, and a top end and a bottom end. The insert also includes a deflection plate.

12 Claims, 6 Drawing Sheets

(56) References Cited

U.S. PATENT DOCUMENTS

| | | | |
|---|---|---|---|
| 4,417,565 A * | 11/1983 | Karpinia | F23Q 13/04 |
| | | | 126/25 B |
| 4,587,947 A | 5/1986 | Tomita | |
| 4,850,151 A * | 7/1989 | Ditscherlein | B24B 31/108 |
| | | | 451/327 |
| 4,867,050 A | 9/1989 | Patenaude et al. | |
| 5,404,864 A * | 4/1995 | Kent, Jr. | A47J 37/0763 |
| | | | 126/25 B |
| 5,425,352 A | 6/1995 | Gillam et al. | |
| 5,687,704 A | 11/1997 | Lerch et al. | |
| 6,016,797 A | 1/2000 | Nowicke, Jr. | |
| 6,213,006 B1 | 4/2001 | Reardon et al. | |
| 6,328,029 B1 | 12/2001 | Nuter | |
| 6,470,875 B2 * | 10/2002 | Liu | A23B 4/052 |
| | | | 126/25 R |
| 7,798,139 B2 | 9/2010 | Gagas et al. | |
| 8,267,078 B2 * | 9/2012 | Kuntz | A47J 37/0786 |
| | | | 126/7 |
| 8,281,709 B2 * | 10/2012 | Sacherman | A47J 27/002 |
| | | | 99/447 |
| 8,851,062 B2 | 10/2014 | Cedar et al. | |
| 8,899,222 B2 * | 12/2014 | DeFoort | F24B 1/003 |
| | | | 126/29 |
| 9,504,353 B1 | 11/2016 | Benson et al. | |
| 2009/0205513 A1 * | 8/2009 | Sacherman | A47J 37/06 |
| | | | 99/426 |
| 2013/0312732 A1 | 11/2013 | Brennan | |
| 2015/0155826 A1 * | 6/2015 | Masaryk | F16L 1/028 |
| | | | 136/244 |
| 2016/0174766 A1 | 6/2016 | Schlosser et al. | |
| 2016/0220066 A1 * | 8/2016 | Roberts | A47J 37/0786 |
| 2017/0159981 A1 * | 6/2017 | Shaaban | F25B 23/00 |
| 2018/0008093 A1 * | 1/2018 | Parker | A47J 37/0754 |
| 2018/0163915 A1 * | 6/2018 | Halper | F16M 11/22 |

FOREIGN PATENT DOCUMENTS

| | | | | |
|---|---|---|---|---|
| WO | WO-2013116946 A1 * | 8/2013 | | A47J 37/0781 |
| WO | WO-2016/123111 A1 | 8/2016 | | |
| WO | WO-2016/171775 A1 | 10/2016 | | |

* cited by examiner

INSERT FOR COOKING APPARATUS

CROSS-REFERENCE TO RELATED APPLICATIONS

This Application claims the benefit of priority to international patent application number PCT/US2019/012930, having a filing date of Jan. 9, 2019, which claims the benefit of U.S. Provisional Application No. 62/631,346, having a filing date of Feb. 15, 2018, and U.S. Provisional Application No. 62/616,333, having a filing date of Jan. 11, 2018, the complete disclosures of which are hereby incorporated by reference for all purposes.

BACKGROUND

The present disclosure relates generally to the field of cooking apparatuses. The present disclosure relates more specifically to an insert configured to be inserted within a barbecue smoker cooking apparatus in a retrofit application to improve the function of the cooking apparatus, particularly in low-temperature (i.e., less than 400° F.) cooking operations.

Smoking and grilling are common methods for cooking food. In the grilling method, food is quickly cooked at relatively high heat by directly applying heat from a heat source such as coal or gas. By contrast, in the smoking method, food is flavored and slowcooked at relatively low heat by exposing it to smoke in a closed container called a smoker. The smoke is usually produced by wood exposed to a heat source such as coal or propane. The wood itself may also be used as a heat source.

There are a number of types of dedicated smoker barbecues used to create this environment. They generally comprise, among other components: a fuel support for charcoal or wood adjacent the lower part of the barbecue, an optional water support pan above the fuel support, and a grill supporting the food to be cooked above the water pan.

SUMMARY

According to one aspect, an insert for use in a low temperature cooking device is provided. The insert includes a ring-shaped insert body formed by a continuous sidewall, the sidewall having an external surface and an internal surface, and a top end and a bottom end. A plurality of projections extend from the top end of the sidewall, and a rim extends from the bottom end of the sidewall, the rim configured to engage a fuel combustion region of the existing cooking apparatus. A heat deflection plate engages the plurality of projections. According to any exemplary embodiment, the insert body is configured for installation completely within the existing cooking apparatus and between the fuel combustion region and a cooking surface of the existing cooking apparatus.

The continuous sidewall may have a shape at least partially defined by a hyperboloid. An outer diameter of the top end of the insert body may be smaller than an outer diameter of the bottom end of the insert body. The insert body may be formed as a single monolithic piece, or as a pair of mating portions, the mating portions comprising an upper body portion adjacent the top end and a lower body portion adjacent the bottom end. The lower body portion may include one or more receptacles for removably receiving a grill plate. The lower body portion may also include a circumferential lip with a groove disposed around the external surface of the lower body portion, where the groove is configured to collect grease. The lower body portion may also include one or more grease drain holes communicating with the groove to drain grease to the fuel combustion region of the existing cooking apparatus.

The insert body may be formed of any suitable material, such as a ceramic material or a cast aluminum material. The height and width of the insert body may be adjustable. The heat deflection plate may be integrally formed with the plurality of projections and/or the insert body directly. The outer diameter of the heat deflection plate may be smaller than an inside diameter of the top end of the sidewall. The sidewall of the insert body may have any suitable thickness, such as within a range of 1 mm-30 mm, inclusive, but may also be approximately 10 mm thick in one example.

DETAILED DESCRIPTION

Before turning to the FIGURES, which illustrate the embodiments in detail, it should be understood that the disclosure is not limited to the details or methodology set forth in the description or illustrated in the figures. It should also be understood that the terminology is for the purpose of description only and should not be regarded as limiting.

Figure 1:
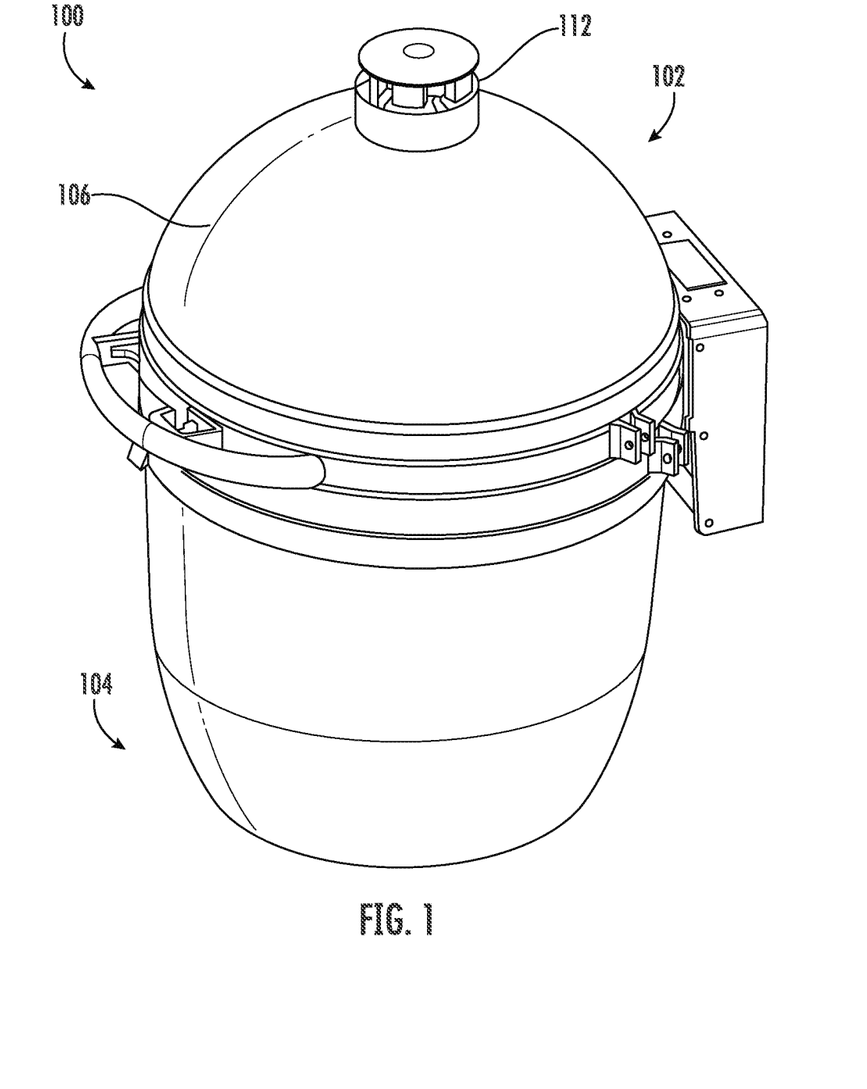
FIG. 1 is an isometric view of a cooking apparatus, according to an exemplary embodiment.
Figure 2:
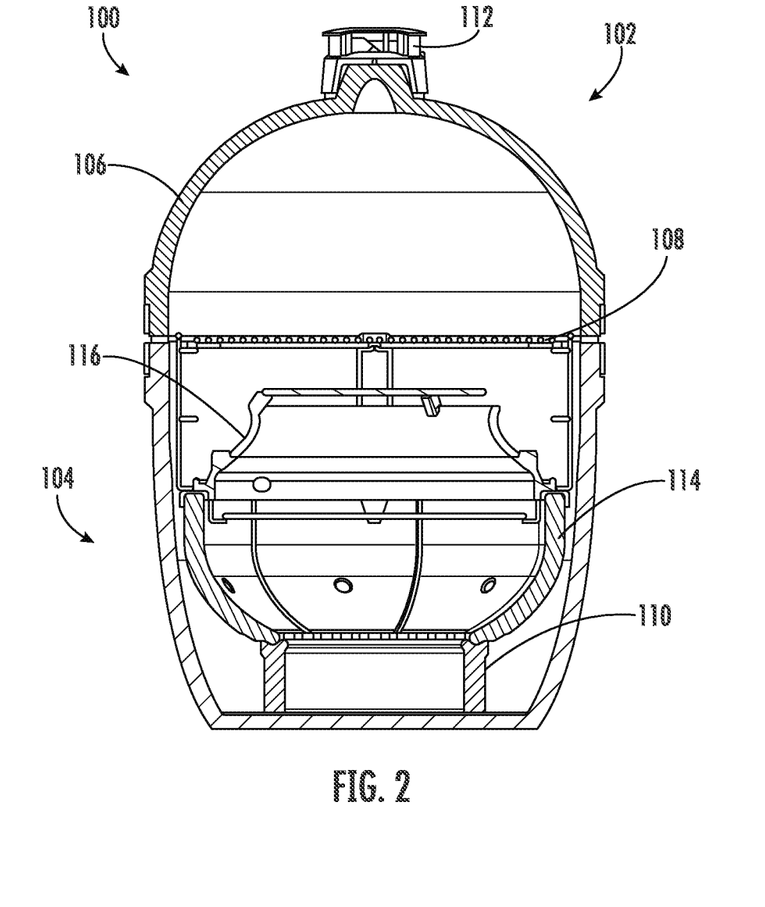
FIG. 2 is a sectional view of the cooking apparatus of FIG. 1, according to an exemplary embodiment.

Referring now to FIG. 1-2, a barbecue smoker cooking apparatus 100 is shown, according to an exemplary embodiment. The apparatus 100 includes a container body having an upper portion 102 and a lower portion 104. In various embodiments, the cooking apparatus 100 is a type of smoker often referred to as a kamado smoker, and upper portion 102 and lower portion 104 are substantially constructed from a heat-retaining material (e.g., ceramic, cast iron) that permit the cooking apparatus 100 to store heat during long cooking periods (e.g., in excess of 12 hours).

A food platform 108 is disposed between the upper portion 102 and the lower portion 104 to retain food within cooking apparatus 100 during the cooking process. Food platform 108 may be any suitable structure for smoking and/or grilling food, such as a grill grate, a grill basket, or a spit. In some embodiments, cooking apparatus 100 also includes a water container disposed below the food platform 108 that provides moisture to the food cooking on the food platform 108. Providing moisture to food may allow the food to absorb more smoke, as the moisture is believed to form a boundary layer around the food that limits the ability of the smoke to flow past the food. Furthermore, the moisture encourages the adsorption of aromatic and other compounds to the surface of the food.

Food platform 108 may be enclosed by a cover 106 with an upper vent 112. Cover 106 may be removably coupled to cooking apparatus 100 such that food and/or water may be added to and removed from apparatus 100. Upper vent 112 may operate as an air outlet at the top of cooking apparatus 100 to allow air and smoke to escape. In some embodiments, the size of upper vent 112 may be configurable by a user to ensure optimal cooking conditions.

The lower portion 104 of cooking apparatus 100 includes a heat source 110, a fuel container 114, and an insert assembly 116. Heat source 110 may be any type of appropriate heat source, such as a coal, wood, propane, or natural gas burner. Fuel container 114 may be any suitable container, basket, or shroud structure that retains fuel for the heat source 110. For example, the fuel may be wood or charcoal pellets, or other suitable material.

Figure 3:
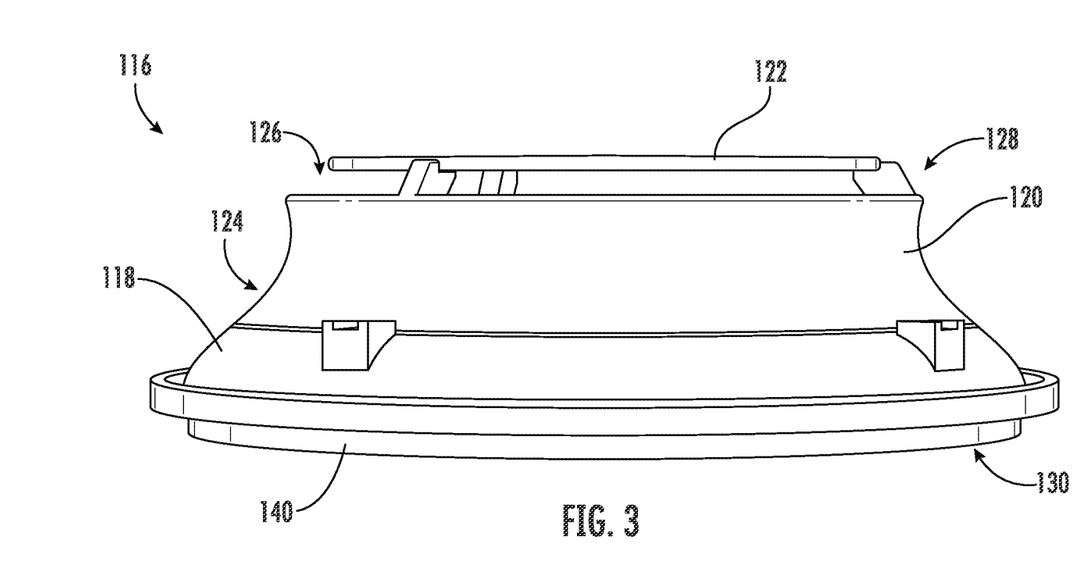
FIG. 3 is detail view of an insert assembly that can be inserted within the cooking apparatus of FIG. 1, according to an exemplary embodiment.
Figure 4:
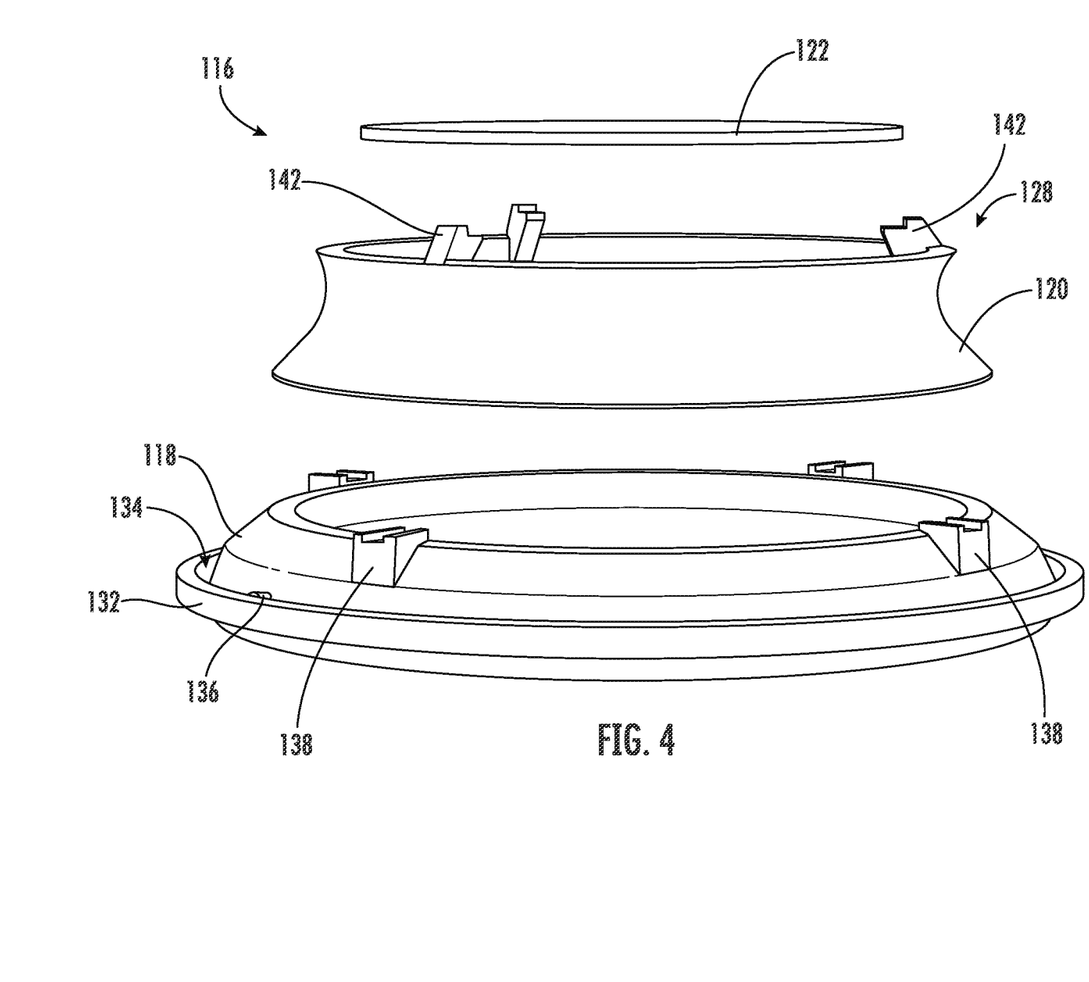
FIG. 4 is an exploded detail view of the insert assembly of FIG. 3, according to an exemplary embodiment.

Referring now to FIGS. 3-4, an insert assembly (shown by way of example as a ring-shaped insert assembly 116) that can be installed within the cooking apparatus 100 is illustrated, according to an exemplary embodiment, for use in adapting or retrofitting an existing cooking apparatus. In some embodiments, the insert assembly 116 is configured to fit entirely within the cooking apparatus 100. For example, the insert assembly 116 may be placed between the fuel container 114 and the cooking surface 108 to modify the airflow and heating characteristics within the cooking apparatus 100.

The insert assembly 116 is shown to include a lower portion 118, an upper portion 120, and a deflector plate 122. In some embodiments, the lower portion 118, the upper portion 120, and the deflector plate 122 are detachably coupled or mated to each other. In other embodiments, the lower portion 118, the upper portion 120, and the deflector plate 122 are inseparably coupled and form a single integrated component. In both cases, the lower portion 118 and upper portion 120 form a continuous sidewall with an external surface 124 and an internal surface 126, and a top end 128 and a bottom end 130. In other embodiments, two or more of lower portion 118, upper portion 120, and deflector plate 122 may be inseparably coupled. For example, lower portion 118 and upper portion 120 may be fabricated as a single component. Alternatively, upper portion 120 and deflector plate 122 may be fabricated as a single component. As shown, in various embodiments, the outer diameter of the top end 128 is smaller than the outer diameter of the bottom end 130.

Insert assembly 116 is shown by way of example as a ring-shaped body having a continuous sidewall as a geometric revolution shell. However, the body of the insert may have any of a wide variety of other shapes configured for adapting an existing cooking apparatus (e.g. paragonal shapes, other geometric revolution shell shapes, etc.).

In some embodiments, the lower portion 118 and the upper portion 120 form an overall hyperboloid shape, as shown by way of example in FIGS. 3 and 4. The hyperboloid shape of the insert assembly 116 may promote increased smoke exposure at the level of the food platform 108 to provide optimal cooking conditions for food. The hyperboloid shape allows the smoke to move rapidly through the narrowest portion of the upper portion 120, and then slow in the wide portion of the upper portion 120 near top end 128 due to the increased diameter. In other embodiments, the geometry of insert assembly 116 may be such that narrowest portion of insert assembly 116 is located in the lower portion 118 or at the intersection between the lower portion 118 and the upper portion 120.

The geometry of insert assembly 116 induces a build-up of air and smoke vortices in the area above the deflector plate 122 and surrounding the cooking surface or food platform 108. Further details of these vortices are included below with reference to FIGS. 5-8. By creating these smoke spirals and/or vortices close to the food on food platform 108, the food is repeatedly exposed to smoke particles which increases the concentration and adsorption of smoky flavor, thus making said food better and of increased smoky flavor.

In some embodiments, any or all of the components of the insert assembly 116 may be adjustable. For example, lower portion 118, upper portion 120, and deflector plate 122 may be fabricated such that the height and width of each of the components 118-122 may be increased or decreased, and the overall dimensions of the insert assembly 116 may be extended or contracted. Adjustments in the dimensions of the insert assembly 116 may permit a specific pattern of airflow (e.g., a linear velocity profile of air and/or smoke, a local pressure profile) to be achieved that is optimal for cooking.

Still referring to FIGS. 3-4, in some embodiments, the hyperboloid shape of the lower portion 118 and the upper portion 120 of the insert assembly 116 is a one-sheeted hyperboloid defined by the equation:

$$\frac{x^2}{a^2} + \frac{y^2}{b^2} - \frac{z^2}{c^2} = 1$$

where the equation is a parametric equation in which the revolution of a line about a central axis has the following properties:

$$x = \frac{A}{\cos(s)}$$
$$z = b * \tan(s)$$
$$-\arccos\left(\frac{203}{320}\right) \le s \le \arccos\left(\frac{203}{210}\right)$$
$$A = 90$$
$$b = 190$$

In an exemplary embodiment, the lower portion 118 and the upper portion 120 have a thickness of approximately 10 mm. In other embodiments, the lower portion 118 and the upper portion 120 may have a range of thicknesses (e.g., 1 mm-30 mm) depending on the structural stability and heat retention characteristics desired. According to some embodiments, the parameter s could be within a range of −1 to +1 (inclusive). In various embodiments, the coefficient A could be 90, as shown above, or could be within a range of approximately 30 to 130 (inclusive). In various embodiments, the coefficient b could be 190, as shown above, or could be within a range of approximately 150 to 250 (inclusive). All such variations are intended to be within the scope of this disclosure. In still further embodiments, the overall dimensions of the insert assembly 116 may be scaled up or down according to the dimensions of the cooking apparatus 100. Although the insert assembly 116 has been described with reference to a hyperboloid shape, other insert assembly shapes (e.g., shapes formed by the revolution of a line about a central axis, asymmetrical shapes) are within the scope of the present disclosure.

The lower portion 118 of the insert assembly 116 is further shown to include a circumferential lip 132 extending radially from a central axis of the insert assembly 116. In some embodiments, the circumferential lip 132 extends to rest on an internal base of the firebox, is continuous with the fuel container 114, or extends to rest on one or more protrusions located on the inner walls of the lower portion 104. In still further embodiments, circumferential lip 132 may not be a continuous ring, but may include one or more projections of various shapes that support the insert assembly 116 on the fuel container 114. The circumferential lip 132 includes a concentric groove 134 configured to collect grease that is generated by a cooking operation. The groove 134 is in fluid communication with multiple grease drain holes 136 distributed about the circumference of the lower portion 118. The grease drain holes 136 are configured to drain grease collected in the groove 134 into the fuel combustion region (i.e., fuel container 114) of the cooking apparatus 100. A rim 140 extending from the lower end 130 of lower portion 118 may be configured to detachably engage the insert assembly 116 with the fuel container 114.

The lower portion 118 is further shown to include multiple projecting receptacles 138 extending in a vertical direction. The projecting receptacles 138 may be shaped to support grill plates within the cooking apparatus on the exterior, top, or interior surface of the insert assembly 116, or on the top or outer rim surface of the deflector plate 122. In other embodiments, the projecting receptacles 138 may instead be coupled to the upper portion 120 or the deflector plate 122.

The deflector plate 122 is configured to engage with multiple projections 142 extending from the top end 128 of the upper portion 120. The projections 142 do not obstruct airflow between the upper portion 120 and the deflector plate 122. In other embodiments, deflector plate 122 may alternatively rest on projections extending from the lower portion 118 or the interior walls of the lower portion 104. The orientation and location of the deflector plate 122 within the overall cooking apparatus structure may promote even heating, greater smoke residence time around the cooking surface, increased local area pressure due to air build-up, and the formation of smoke spirals around the cooking surface. In some embodiments, the outer diameter of the deflector plate 128 is smaller than the inside diameter of the top end 128 of upper portion 120. According to other embodiments, the deflector plate has a cylindrical shape and is made from a material to promote even heat distribution. The deflector plate may be narrower or wider than the circular cross-section of the hyperboloid ring-shaped insert in its z location. The deflector plate may also be placed at a location relatively higher than the equation z-center of the hyperboloid (i.e., where z=0). Accordingly, all such variations are intended to be within the scope of the disclosure.

In various embodiments, the components of insert assembly 116 may be fabricated from any suitable material or materials. For example, lower portion 118, upper portion 120, and deflector plate 122 may each be fabricated from a ceramic material with high thermal insulation properties. In other embodiments, lower portion 118, upper portion 120, and deflector plate 122 may be fabricated from a cast aluminum material with high durability and insulation properties.

Figure 5:
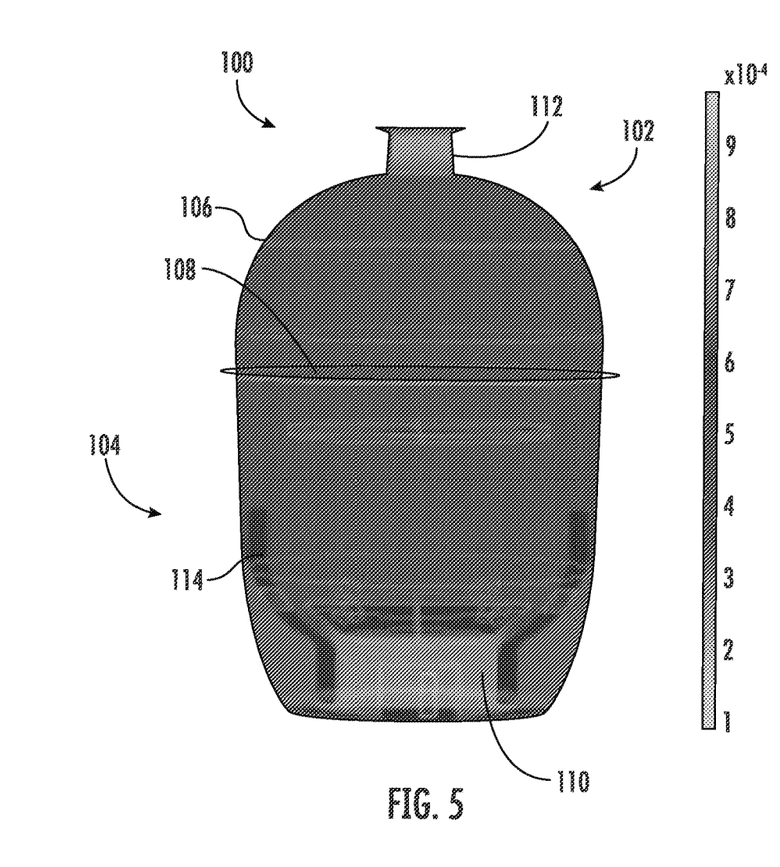
FIG. 5 is a sectional view of a pressure profile of a cooking apparatus that does not contain an insert assembly, according to an exemplary embodiment.
Figure 6:
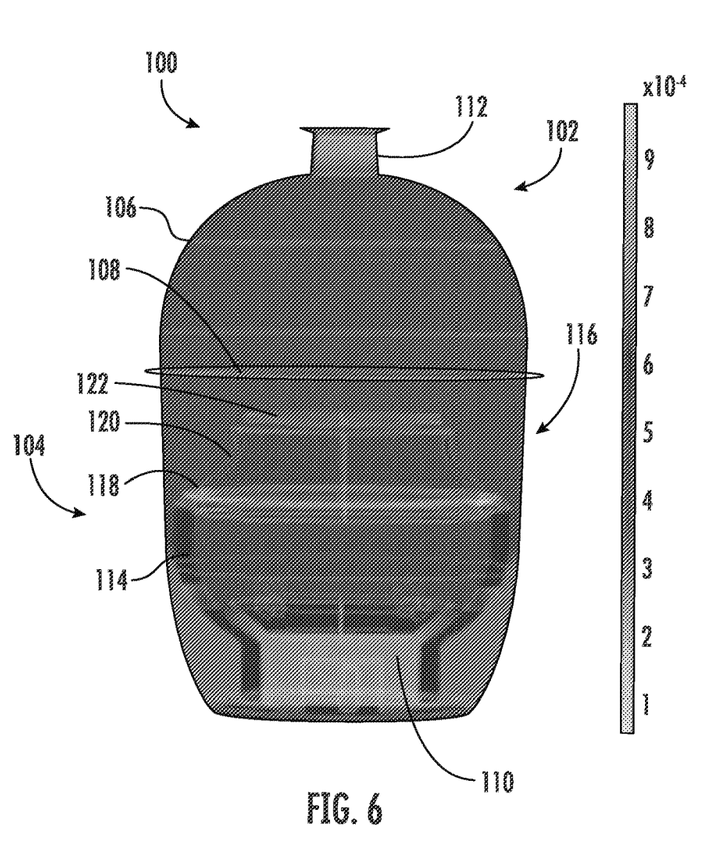
FIG. 6 is a sectional view of a pressure profile of a cooking apparatus that includes the insert assembly of FIG. 3, according to an exemplary embodiment.

Referring now to FIGS. 5-8, sectional views of pressure and aerodynamic profiles of the cooking apparatus 100 are depicted, according to exemplary embodiments. Specifically, FIG. 5 depicts the pressure profile of a cooking apparatus 100 that does not include an insert assembly 116, while FIG. 6 depicts the pressure profile of a cooking apparatus 100 that does include an insert assembly 116. As shown, in both cases, the area of highest pressure in the cooking apparatus 100 is located near the heat source 110. The pressure in the cooking apparatus 100 decreases moving vertically from the lower portion 104 to the upper portion 104, finally reaching the area of the lowest pressure, which is located near the upper vent 112. However, as shown in FIG. 6, the area surrounding the insert assembly 116, and particularly, underneath the deflection plate 122, may be an area of increased local pressure when compared with the same area in FIG. 5, which does not include the insert assembly 116. As additionally shown in FIG. 6, the area above the deflection plate 122 may have a lower pressure than the area beneath the deflection plate 122. This pressure differential, in combination with the increased velocity (e.g. linear velocity, etc.) depicted by way of example in FIGS. 7 and 8, creates a cyclonic airflow pattern that circles around the food on cooking surface 108. According to one embodiment, one optimal airflow pattern would be a cyclonic airflow pattern that is intended to include the presence of vortices at a location proximate the cooking surface, such that the air circling back against the overall and/or preceding orientation (upwards) creates a vortex shape. According to another embodiment, another optimal airflow pattern created by the pressure differential and velocity profile may be a non-laminar airflow pattern (e.g. which may include turbulent, cyclonic, or other optimal airflow pattern for increasing the smoke particle contact and/or exposure with the food, all of which are intended to be within the scope of this disclosure).

Figure 7:
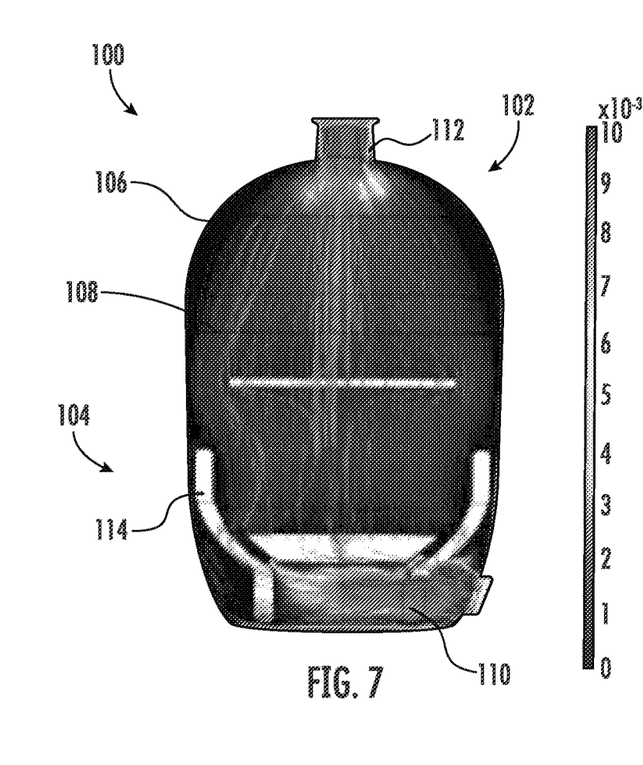
FIG. 7 is a sectional view of an aerodynamic profile of a cooking apparatus that does not contain an insert assembly, according to an exemplary embodiment.
Figure 8:
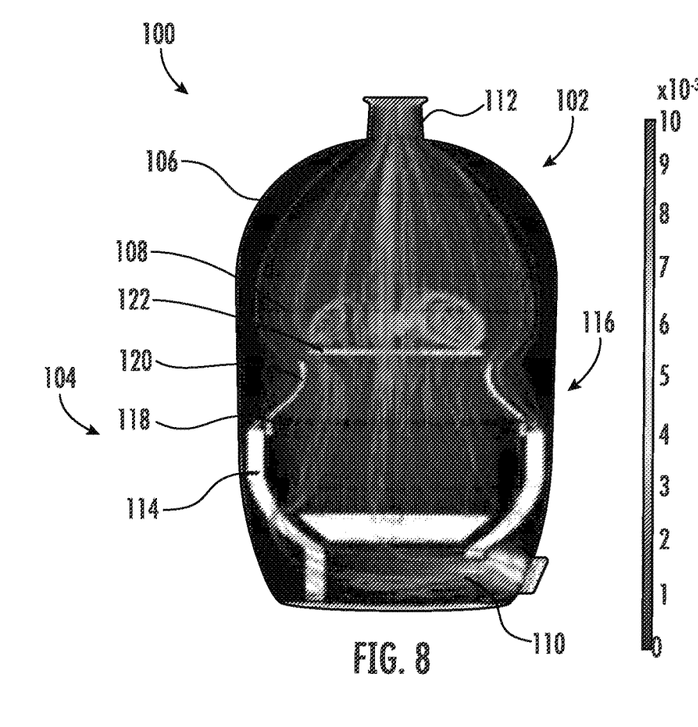
FIG. 8 is a sectional view of an aerodynamic profile of a cooking apparatus that includes the insert assembly of FIG. 3, according to an exemplary embodiment.

Referring now to FIGS. 7 and 8, sectional views of the aerodynamic profile of a cooking apparatus 100 without an insert assembly 116 (see FIG. 7) and containing an insert assembly 116 (see FIG. 8) are shown, according to exemplary embodiments. As described above, FIG. 8 is shown to include air and smoke spirals or vortices in the area above the deflection plate 122. The air and smoke spirals or vortices may flow in the opposite direction of the overall and natural airstream direction, as depicted in FIG. 7. This cyclonic airflow behavior increases the exposure of the food to the smoke, increases the intensity of the flavoring, and is a direct result of the pressure differential and velocity profile induced in the cooking apparatus 100 by the insert assembly 116.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

According to any exemplary embodiment, an improved insert is provided for adapting or retrofitting an existing cooking apparatus for improved function as a low temperature cooking device. The insert improves the function of the existing cooking apparatus (e.g. grill/smoker/low temperature cooker, etc.) by providing more even heat around the cooking surface, by increasing the air residence time around the cooking surface, by promoting formation of 'smoke spirals' or cyclonic airflow around the cooking surface, and by directing grease and other cooking fluids to the fuel combustion chamber of the device. The retrofitting operation may be easily accomplished by placing the insert between the fuel combustion region and the cooking surface of the existing device, where it can modify the air and heat to perform the functions outlined above. The adaptability of the insert permits improved and/or adapted performance of an existing cooking device, without the time and expense of having to replace the existing device.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the insert for retrofitting the cooking apparatus as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. An insert for use in a cooking apparatus having a fuel container in a fuel combustion region that alters the pressure profile and air velocity and flow profile of said cooking apparatus in order to achieve an optimal air profile around food to be cooked, the insert comprising:
    an insert body formed by a continuous sidewall having a shape at least partially defined by a hyperboloid, the sidewall having an external surface and an internal surface, said insert body having:
        a first opening at an upper end and a second opening at a lower end;
        a circumferential lip proximate the lower end defining a concentric groove;
        one or more grease drain holes configured to drain grease collected in the groove to the fuel combustion region;
        a rim extending from the lower end, the rim detachably engaging an upper end of the fuel container; and
        a deflection plate coupled to the insert body at a height above the upper end.

2. The insert of claim 1, wherein the insert body is configured for installation completely within the cooking apparatus and between a fuel combustion region and a cooking surface of the existing cooking apparatus.

3. The insert of claim 1, wherein the insert further comprises a plurality of projections extending from a top end of the sidewall, and wherein the deflection plate is engageable with the plurality of projections.

4. The insert of claim 2, wherein the insert further comprises a rim extending from a bottom end of the sidewall, the rim configured to engage a fuel combustion region of the existing cooking apparatus.

5. The insert of claim 1, wherein the insert body is substantially ring-shaped and the deflection plate is detachably coupled to the insert body proximate the upper end.

6. The insert of claim 5, wherein an outer diameter of a top end of the insert body is smaller than an outer diameter of a bottom end of the insert body.

7. The insert of claim 6, wherein the insert body is formed as a pair of mating portions, the mating portions comprising an upper body portion adjacent the top end and a lower body portion adjacent the bottom end.

8. The insert of claim 7, wherein at least one of the lower body portion and the upper body portion comprises one or more receptacles for removably receiving a grill plate.

9. The insert of claim 3, wherein the deflection plate is integrally formed with a plurality of projections.

10. The insert of claim 1, wherein an outer diameter of the deflection plate is smaller than an inside diameter of the top end of the sidewall.

11. The insert of claim 5, wherein the shape of the hyperboloid is a one-sheeted hyperboloid defined by an equation:

$$\frac{x^2}{a^2} + \frac{y^2}{b^2} - \frac{z^2}{c^2} = 1.$$

12. The insert of claim 11, further wherein the equation is a parametric equation in which the revolution of a line about a central axis has the following properties:

$$x = \frac{A}{\cos(s)}$$
$$z = b * \tan(s)$$
$$-\arccos\left(\frac{203}{320}\right) \leq s \leq \arccos\left(\frac{203}{210}\right)$$
$$A = 90$$
$$b = 190.$$

* * * * *